(12) United States Patent
Wildermuth

(10) Patent No.: US 8,172,273 B2
(45) Date of Patent: May 8, 2012

(54) SEALING ARRANGEMENT FOR A COUPLING FOR REFRIGERANT LINES

(75) Inventor: Andreas Wildermuth, Marbach (DE)

(73) Assignee: ContiTech Kuehner GmbH & Cie. KG, Oppenweiler (DE)

( * ) Notice: Subject to any disclaimer, the term of this patent is extended or adjusted under 35 U.S.C. 154(b) by 34 days.

(21) Appl. No.: 12/320,610

(22) Filed: Jan. 30, 2009

(65) Prior Publication Data

US 2009/0206596 A1    Aug. 20, 2009

Related U.S. Application Data

(63) Continuation-in-part of application No. PCT/EP2007/055874, filed on Jun. 14, 2007.

(30) Foreign Application Priority Data

Aug. 1, 2006    (DE) .......................... 10 2006 035 717

(51) Int. Cl.
*F16L 41/00*    (2006.01)

(52) U.S. Cl. ............ 285/206; 285/205; 285/379; 285/4; 277/609

(58) Field of Classification Search .................. 285/379, 285/3, 4, 205, 206; 277/608, 609, 616
See application file for complete search history.

(56) References Cited

U.S. PATENT DOCUMENTS

| | | | | |
|---|---|---|---|---|
| 2,127,578 A | * | 8/1938 | Wyman | 285/379 |
| 3,846,030 A | * | 11/1974 | Katt | 285/4 |
| 6,106,030 A | | 8/2000 | Nader et al. | |
| 6,386,593 B1 | | 5/2002 | Slais et al. | |
| 6,893,052 B2 | | 5/2005 | Wildermuth et al. | |
| 6,969,094 B2 | | 11/2005 | Fröhling et al. | |
| 2003/0080554 A1 | | 5/2003 | Schroeder et al. | |
| 2004/0145124 A1 | * | 7/2004 | Yoakam et al. | 277/609 |

* cited by examiner

*Primary Examiner* — James Hewitt
*Assistant Examiner* — Jay R Ripley
(74) *Attorney, Agent, or Firm* — Walter Ottesen

(57) ABSTRACT

A sealing arrangement for a coupling for refrigerant lines comprises a first coupling piece, which is connected sealingly to a first line end piece, and a second coupling piece which is connected sealingly to a second line end piece. In the sealing arrangement, a sealing ring is held on the sealing face of one of the two coupling pieces by a holding device which is configured as a plastic cap having a through hole. The plastic cap has at least one predetermined breaking location (26) which is configured as a groove which reduces the material thickness of the plastic cap in such a way that the material integrity at the predetermined breaking location (26) is maintained during assembly and breaks apart during disassembly.

14 Claims, 3 Drawing Sheets

US 8,172,273 B2

SEALING ARRANGEMENT FOR A COUPLING FOR REFRIGERANT LINES

CROSS REFERENCE TO RELATED APPLICATIONS

This application is a continuation-in-part application of international patent application PCT/EP 2007/055874, filed Jun. 14, 2007, designating the United States and claiming priority from German application 10 2006 035 717.5, filed Aug. 1, 2006, and the entire content of both applications is incorporated herein by reference.

FIELD OF THE INVENTION

The invention relates to a sealing arrangement for a coupling for refrigerant lines comprising a first coupling piece, which is connected sealingly to a first line end piece, and a second coupling piece which is connected sealingly to a second line end piece. Both coupling pieces are joined to each other by fastening means such that the line end pieces are connected to one another via respective bores in the coupling pieces. The two coupling pieces each have a radially extending sealing face on the side facing toward the other coupling piece. Only one single screw is provided as fastening means which is arranged laterally offset from the sealing faces. A non-compressible molded body is arranged as a spacer between the coupling pieces at a distance from the screw on the side which is facing away from the sealing faces of the coupling pieces. The non-compressible molded body is configured such that, when screwing together the coupling pieces, a lever action is produced which results in the uniform compression of a sealing ring arranged between the sealing faces of the coupling pieces. In the sealing arrangement, the sealing ring is held against the sealing face of one of the two coupling pieces by a holding device which is configured as a plastic cap having a through-bore. At a first axial end of the through-bore, the plastic cap comprises retaining lugs projecting radially into the through-bore. By means of the retaining lugs, the sealing ring can be secured in its position between the sealing face of the coupling piece and the retaining lugs.

BACKGROUND OF THE INVENTION

Such a sealing arrangement is known from U.S. Pat. No. 6,893,052 which is incorporated herein by reference. In the sealing arrangement disclosed in this patent, the plastic cap is arranged between the sealing faces and holds the sealing ring in position. The plastic cap and one of the coupling pieces are configured such that the plastic cap can simply be fastened between the sealing faces, even before the coupling pieces are screwed together. To this end, one of the coupling pieces has a radial peripheral projection oriented outwardly in the external region of the sealing face. The correspondingly configured plastic cap is clipped onto this radial peripheral projection.

During dismantling, the plastic cap has to be levered out by a tool. This involves the risk that the sealing faces of the coupling piece become scratched. The levered-off plastic cap should not be used after disassembly, but can only be differentiated from a new cap with the greatest difficulty so that confusion may result with the unwanted result that the old cap is used again.

SUMMARY OF THE INVENTION

It is an object of the invention to provide a sealing arrangement of the above type which allows a simpler and more reliable handling of the sealing arrangement and avoids the above-mentioned disadvantages.

This object is achieved in that the plastic cap has at least one predetermined breaking location which is configured as a groove which reduces the material thickness of the plastic cap such that the material integrity at the predetermined breaking location is maintained during assembly and breaks apart during disassembly.

Such a predetermined breaking location affords the advantage that the plastic cap can even be disassembled without a tool, as the predetermined breaking location easily breaks apart during disassembly and, therefore, only a small expenditure of force is necessary for disassembly. Damage to the sealing face of the coupling piece is thus prevented. Moreover, the plastic cap can not be used again after disassembly.

BRIEF DESCRIPTION OF THE DRAWING

The invention will now be described with reference to the drawings wherein.

DESCRIPTION OF THE PREFERRED EMBODIMENTS OF THE INVENTION

Figure 1:
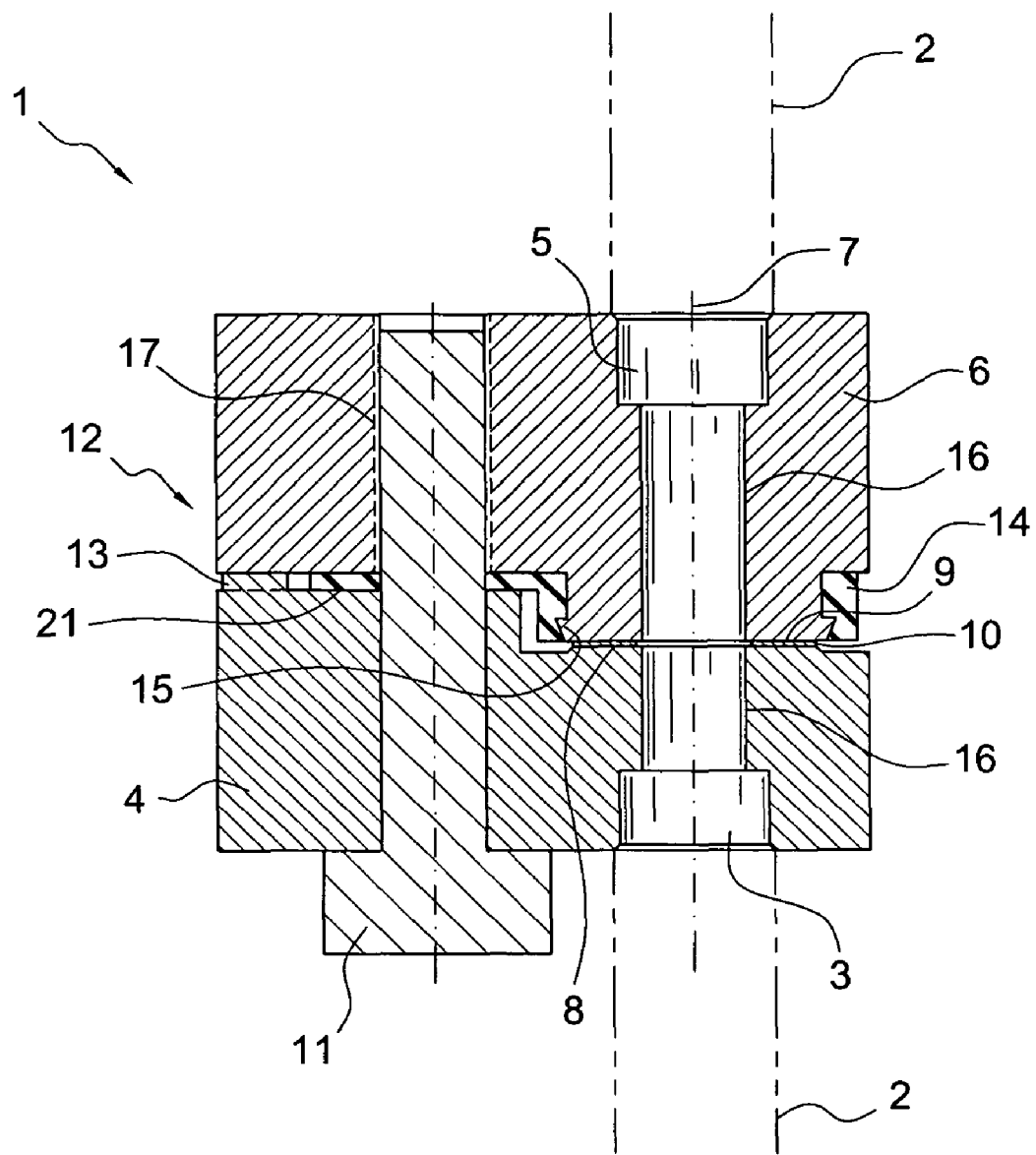
FIG. 1 is a schematic section view of a connecting arrangement incorporating a plastic cap for holding a sealing ring in accordance with the sealing arrangement of the invention.

The connecting arrangement 1 shown in FIG. 1 is for coolant lines 2 and comprises a first coupling piece 4 and a second coupling piece 6. The first coupling piece 4 is connected tightly to a first line endpiece 3 and the second coupling piece 6 is tightly connected to a second line endpiece 5. Each of the coupling pieces (4, 6) includes a bore 16 in which the corresponding one of the line endpieces (3, 5) is fitted in. The bore 16 has, at the same time, the function of a connecting channel. Both coupling pieces 4 and 6 are threadably fastened to each other by a single screw 11. A bore 17 in the coupling piece 6 has an internal thread. Because of the threaded connection, the line endpieces (3, 5) are alignedly connected to each other via the bore 16 along an axis 7. The two coupling pieces 4 and 6 furthermore each include a radially extending sealing surface 8 and 9 on the end facing toward the other coupling piece 6 and 4. A sealing ring 10 is arranged between the sealing surfaces 8 and 9. The above-mentioned single screw 11 is arranged laterally of the sealing surfaces 8 and 9.

A non-compressible form body 13 is arranged as a support between the coupling pieces 4 and 6 at a spacing from the single screw 11 and on the side 12 facing away from the sealing surfaces 8 and 9 of the coupling pieces 4 and 6. The form body 13 is so configured that a lever action occurs when the coupling pieces 4 and 6 are screwed together and this lever action leads to a uniform pressing together of the sealing ring 10 between the sealing surfaces 8 and 9 of the coupling pieces 4 and 6. The sealing ring 10 can be made, for example, of aluminum. The non-compressible form body or support 13 is configured as a component of the first coupling piece 4. The support 13 can be formed as an integral raised part of one of the two coupling pieces (4, 6) and is to the left of the single screw 11 as shown in FIG. 1.

The sealing ring 10 is placed in a plastic cap 14 which is arranged between the coupling pieces (4, 6) so that the sealing ring 10 is disposed between the sealing surfaces 8 and 9. The plastic cap 14 and the second coupling piece 6 are so configured that the plastic cap 14 can be attached easily to coupling piece 6 to place the sealing ring 10 between the sealing surfaces 8 and 9 in advance of threadably fastening the coupling pieces 4 and 6 to each other by manipulating the single screw 11. For holding the plastic cap 14 in place, the second coupling piece 6 has a radially extending and outwardly directed projection 15 in the outer region of the sealing surface 9 on which the correspondingly configured plastic cap 14 is clipped on.

Figure 2:
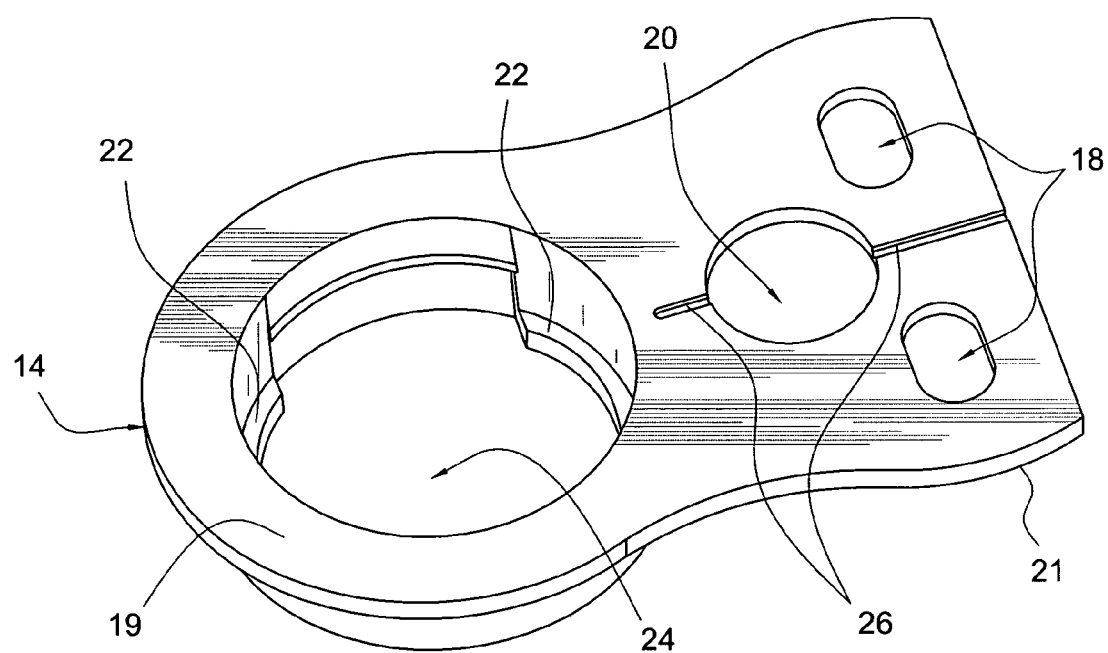
FIG. 2 is a perspective view showing the plastic cap.

The plastic cap 14 shown in FIG. 1 has a body 19 made of a resilient plastic comprising a principal bore 24 and three secondary bores 18 and 20 as shown in FIG. 2. The secondary bores 18 serve as positioning aids relative to coupling pieces (4, 6) and the secondary bore 20 serves as a through-hole for the screw 11 by means of which the coupling pieces (4, 6) can be screwed together.

The plastic cap 14 includes a handle-like extension 21 and has retaining lugs 22 projecting in the radial direction in the principal bore 24. These retaining lugs 22 are arranged at a first axial end of the principal bore 24 of the plastic cap 14 located at the bottom in FIGS. 2 and 3. The radial projection of the retaining lugs 22 is dimensioned such that a sealing ring 10, which can be inserted into the principal bore 24, is prevented from falling through the principal bore 24 by the retaining lugs 22.

The body 19 of the plastic cap 14, moreover, has two predetermined breaking locations 26 which are configured as an approximately V-shaped groove, reducing the material thickness of the body 19. These predetermined breaking locations 26 break during the dismantling of the plastic cap 14, so that the plastic cap 14 cannot be used again. At the same time, the sealing ring 10 falls out of the plastic cap 14 and can also not be used again.

The plastic cap 14 does not extend laterally beyond the coupling pieces (4, 6) when disposed therebetween.

Figure 3:
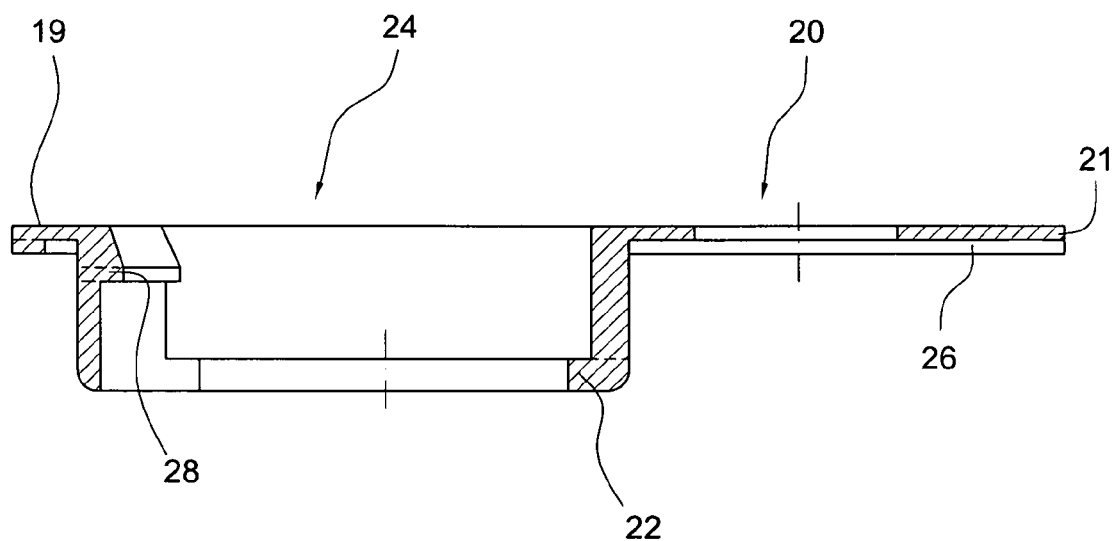
FIG. 3 is a side elevation view, in section, of the plastic cap shown in FIGS. 1 and 2.

The plastic cap 14 includes a latch nose 28 which is tapered and inclined in the direction of clipping the plastic cap into position on the coupling piece 6 during assembly. The latch nose 28 coacts with the projection 15 to hold the plastic cap 14 with sealing ring 10 in place. For this reason, the force needed to mount the cap 14 during assembly is less than during disassembly. During disassembly, the plastic cap 14 breaks apart at the predetermined breaking location 26 because of the greater force needed to dislodge the plastic cap from its latched position. As shown in FIG. 3, the predetermined breaking location 26 extends from the lower side (the lower side in FIGS. 2 and 3) of the handle-like extension 21.

The design of the plastic cap 14 according to the invention thus allows a simplified and more reliable handling of the sealing arrangement, primarily during disassembly.

It is understood that the foregoing description is that of the preferred embodiments of the invention and that various changes and modifications may be made thereto without departing from the spirit and scope of the invention as defined in the appended claims.

List Of Reference Numerals
(part of the description)
1 Connecting arrangement
2 Coolant lines
3 First line endpiece
4 First coupling piece
5 Second line endpiece
6 Second coupling piece
7 Axis
8 Sealing surface
9 Sealing surface
10 Sealing ring
11 Single screw
12 Side facing away from sealing surfaces 8 and 9
13 Non-compressible form body or support
14 Plastic cap
15 Outwardly directed projection
16 Bore
17 Bore
18 Secondary bores as positioning aids
19 Body
20 Secondary bore as a through-hole
21 Handle-like extension
22 Retaining lugs
24 Principal bore
26 Predetermined breaking locations
28 Latch nose

What is claimed is:

1. A sealing arrangement for a coupling for coolant lines, the coupling including a first coupling piece connected seal tight to a first line end piece; a second coupling piece connected seal tight to a second line end piece; said first and second coupling pieces having first and second bores, respectively, and said first and second bores communicating with said first and second line end pieces, respectively; a single screw joining said first and second coupling pieces so as to cause said first and second line end pieces to communicate with each other via said first and second bores; said first and second coupling pieces having first and second sealing surfaces facing toward each other; a sealing ring disposed between said first and second coupling pieces; a non-compressible body disposed between said first and second coupling pieces at a distance from said single screw which is so configured that a lever action arises when said single screw is manipulated to draw said first and second coupling pieces toward each other with said lever action leading to a uniform pressing of said sealing ring between said first and second sealing surfaces; and, said first and second sealing surfaces extending radially and being laterally offset from said single screw on a side of said single screw facing away from said non-compressible body; and, said sealing arrangement comprising:

a plastic cap for holding said sealing ring on the sealing surface of one of said coupling pieces;

said plastic cap defining a passthrough bore having a first axial end;

said plastic cap having a holding seat at said first axial end projecting into said passthrough bore for fixing said sealing ring in its position between the sealing surface of said one coupling piece and said holding seat and said plastic cap remaining in place with said sealing ring until disassembly of said coupling;

said plastic cap having an appendage wherein at least one predetermined breaking location configured as a groove is formed whereat the material thickness of said appendage is reduced so as to cause the integrity of the material at said predetermined breaking location to be maintained during assembly with application of a first force while permitting said plastic cap to break apart during disassembly when a second force is applied to said plastic cap greater than said first force so as to cause said sealing ring to fall out of said plastic cap and to preclude reuse of said plastic cap and inadvertent reuse of said sealing ring;

said passthrough bore having a longitudinal axis;

said appendage extending substantially in a plane transverse to said longitudinal axis of said passthrough bore; and, said appendage having an aperture formed therein for accommodating said single screw.

2. The sealing arrangement of claim 1, wherein said holding seat comprises a plurality of lugs at said first axial end projecting into said passthrough bore.

3. The sealing arrangement of claim 1, wherein said one of said coupling pieces has a radially extending and outwardly directed projection formed thereon in the region of the sealing surface thereof; and, said sealing arrangement further comprising said passthrough bore of said plastic cap having a second axial end opposite said first axial end; and, said plastic cap having a tapered latch nose formed thereon so as to slide over said projection and snap thereunder when said plastic cap holding said sealing ring is attached to said one coupling piece.

4. A sealing and coupling arrangement comprising:
a coupling for coolant lines;
the coupling including a first coupling piece connected seal tight to a first line end piece;
a second coupling piece connected seal tight to a second line end piece;
said first and second coupling pieces having first and second bores, respectively, and said first and second bores communicating with said first and second line end pieces, respectively;
a single screw joining said first and second coupling pieces so as to cause said first and second line end pieces to communicate with each other via said first and second bores;
said first and second coupling pieces having first and second sealing surfaces facing toward each other;
a sealing ring disposed between said first and second coupling pieces;
a non-compressible body disposed between said first and second coupling pieces at a distance from said single screw which is so configured that a lever action arises when said single screw is manipulated to draw said first and second coupling pieces toward each other with said lever action leading to a uniform pressing of said sealing ring between said first and second sealing surfaces;
said first and second sealing surfaces extending radially and being laterally offset from said single screw on a side of said single screw facing away from said non-compressible body;
a plastic cap for holding said sealing ring on the sealing surface of one of said coupling pieces;
said plastic cap defining a passthrough bore having a first axial end;
said plastic cap having a holding seat at said first axial end projecting into said passthrough bore for fixing said sealing ring in its position between the sealing surface of said one coupling piece and said holding seat and said plastic cap remaining in place with said sealing ring until disassembly of said coupling;
said plastic cap having an appendage wherein at least one predetermined breaking location configured as a groove is formed whereat the material thickness of said appendage is reduced so as to cause the integrity of the material at said predetermined breaking location to be maintained during assembly with application of a first force while permitting said plastic cap to break apart during disassembly when a second force is applied to said plastic cap greater than said first force so as to cause said sealing ring to fall out of said plastic cap and to preclude reuse of said plastic cap and inadvertent reuse of said sealing ring;
said passthrough bore having a longitudinal axis;
said appendage extending substantially in a plane transverse to said longitudinal axis of said passthrough bore; and,
said appendage having an aperture formed therein for accommodating said single screw.

5. The sealing and coupling arrangement of claim 4, wherein said holding seat comprises a plurality of lugs at said first axial end projecting into said passthrough bore.

6. The sealing and coupling arrangement of claim 4, wherein said one coupling piece has a radially extending and outwardly directed projection formed thereon in the region of the sealing surface thereof; said passthrough bore of said plastic cap has a second axial end opposite said first axial end; and, said plastic cap has a tapered latch nose formed thereon so as to slide over said projection and snap thereunder when said plastic cap holding said sealing ring is attached to said one coupling piece.

7. The sealing and coupling arrangement of claim 4, wherein said appendage is a handle-shaped appendage disposed between said first and second coupling pieces.

8. The sealing and coupling arrangement of claim 7, wherein said handle-shaped appendage defines a longitudinal axis passing through said aperture and said groove is formed in two segments along said longitudinal axis with said segments being separated from each other by said aperture.

9. The sealing arrangement of claim 1, wherein said appendage is a handle-shaped appendage disposed between said first and second coupling pieces.

10. The sealing arrangement of claim 9, wherein said handle-shaped appendage defines a longitudinal axis passing through said aperture and said groove is famed in two segments along said longitudinal axis with said segments being separated from each other by said aperture.

11. The sealing arrangement of claim 1, wherein said plastic cap having said appendage does not project beyond said first and second coupling pieces when seated therebetween.

12. A sealing and coupling arrangement comprising:
a coupling for coolant lines;
the coupling including a first coupling piece connected seal tight to a first line end piece;
a second coupling piece connected seal tight to a second line end piece;
said first and second coupling pieces having first and second bores, respectively, and said first and second bores communicating with said first and second line end pieces, respectively;
a screw joining said first and second coupling pieces so as to cause said first and second line end pieces to communicate with each other via said first and second bores;
said first and second coupling pieces having first and second sealing surfaces facing toward each other to conjointly define an interface;
a sealing ring disposed between said first and second coupling pieces at said interface;
a non-compressible body disposed between said first and second coupling pieces at a distance from said screw which is so configured that a lever action arises when said screw is manipulated to draw said first and second coupling pieces toward each other with said lever action leading to a uniform pressing of said sealing ring between said first and second sealing surfaces;
said first and second sealing surfaces extending radially and being laterally offset from said screw on a side of said screw facing away from said non-compressible body;
a plastic cap for holding said sealing ring on the sealing surface of one of said coupling pieces;

said plastic cap defining a passthrough bore having a first axial end;

said plastic cap having a holding seat at said first axial end projecting into said passthrough bore for fixing said sealing ring in its position between the sealing surface of said one coupling piece and said holding seat and said plastic cap remaining in place with said sealing ring until disassembly of said coupling;

said plastic cap having an appendage wherein at least one predetermined breaking location configured as a groove is formed whereat the material thickness of said appendage is reduced so as to cause the integrity of the material at said predetermined breaking location to be maintained during assembly with application of a first force while permitting said plastic cap to break apart during disassembly when a second force is applied to said plastic cap greater than said first force so as to cause said sealing ring to fall out of said plastic cap and to preclude reuse of said plastic cap and inadvertent reuse of said sealing ring;

said passthrough bore having a longitudinal axis;

said appendage extending substantially in a plane transverse to said longitudinal axis of said passthrough bore; and, said appendage having an aperture formed therein for accommodating said screw.

13. The sealing and coupling arrangement of claim 12, wherein said appendage is a handle-shaped appendage disposed between said first and second coupling pieces.

14. The sealing and coupling arrangement of claim 13, wherein said plastic cap having said appendage does not project beyond said first and second coupling pieces when seated therebetween.

\* \* \* \* \*

UNITED STATES PATENT AND TRADEMARK OFFICE
CERTIFICATE OF CORRECTION

| | |
|---|---|
| PATENT NO. | : 8,172,273 B2 |
| APPLICATION NO. | : 12/320610 |
| DATED | : May 8, 2012 |
| INVENTOR(S) | : Andreas Wildermuth |

It is certified that error appears in the above-identified patent and that said Letters Patent is hereby corrected as shown below:

In Column 6:
Line 31: delete "famed" and substitute -- formed -- therefor.

Signed and Sealed this
Seventh Day of August, 2012

David J. Kappos
*Director of the United States Patent and Trademark Office*